United States Patent [19]

Kondo

[11] Patent Number: 5,526,046
[45] Date of Patent: Jun. 11, 1996

[54] COMBINATION MOVING IMAGE AND STILL IMAGE VIDEO CAMERA WITH RESPONSE SPEED CONTROL

[75] Inventor: Toshiharu Kondo, Kanagawa, Japan

[73] Assignee: Sony Corporation, Tokyo, Japan

[21] Appl. No.: 344,353

[22] Filed: Nov. 23, 1994

Related U.S. Application Data

[63] Continuation of Ser. No. 70,786, Jun. 3, 1993, abandoned.

[30]     Foreign Application Priority Data

Jun. 12, 1992 [JP] Japan .................... 4-179471

[51] Int. Cl.$^6$ .......................... H04N 5/225; H04N 5/238
[52] U.S. Cl. .......................... 348/220; 348/224; 348/363
[58] Field of Search .................... 348/207, 220, 348/224, 225, 363, 221; 358/906, 909.1

[56]             References Cited

U.S. PATENT DOCUMENTS 4,714,963  12/1987  Vogel ........................ 358/909
4,763,204   8/1988  Kinoshita et al. ............. 358/209
4,899,212   2/1990  Kaneko et al. ................ 358/909
5,206,730   4/1993  Sakai ......................... 348/220
5,278,659   1/1994  Araki ......................... 358/228

Primary Examiner—Wendy Greening
Assistant Examiner—Bipin Shalwala
Attorney, Agent, or Firm—Jay H. Maioli

[57]             ABSTRACT

A video camera capable of photographing in a moving image mode and a still image mode comprises a mechanical shutter provided near the front surface of an image pickup device and a detector provided with an image pickup signal according to the state of the mechanical shutter. A controller receives an output of the detector. The controller includes a filter and a filter controller for controlling the time constant of the filter. The time constant of the filter is decreased by the filter controller when a control signal for the video camera is generated.

2 Claims, 2 Drawing Sheets

5,526,046

COMBINATION MOVING IMAGE AND STILL IMAGE VIDEO CAMERA WITH RESPONSE SPEED CONTROL

This is a continuation of application Ser. No. 08/07,786, filed Jun. 3, 1993 now abandoned.

BACKGROUND OF THE INVENTION

1. Field of the Invention

This invention relates to a video camera capable of photographing in a moving image mode and a still image mode.

2. Description of the Prior Art

Video cameras are in practical use which have a still image mode for photographing a subject as a still image in addition to a moving image mode for continuously photographing the subject. A still image is recorded, for example, in a PCM area on video tape. An image signal taken in the still image mode can be output in a printed form by using a video printer or the like.

Memory is usually used for photographing a subject in the still image mode. That is, an image photographed in the still image mode is once stored in a memory for each field or frame, and the stored contents in the memory are continuously output to provide a still image. The still image provided synchronizes with the video signal.

In order to enable photographing in the still image mode, a mechanical shutter, for example, is provided on the video camera. When a still image is desired, the mechanical shutter is switched from the open status to the closed status at a desired timing. At the same time, a control is done so that the CCD image pickup device is not exposed as long as the closed status of the mechanical shutter is maintained.

During photographing in the still image mode, the mechanical shutter is held in the closed status. Therefore, light to be otherwise injected to the video camera is being blocked. When the mechanical shutter is changed to the open status to switch the mode from the still image mode to the moving image mode, a large amount of light is injected at once to the video camera. This occurs, in particular, when photographing a moving image in an outdoor brightness after photographing a still image in an indoor darkness.

Moreover, if there is a large change in photographed scene upon transition from the still image mode to the moving image mode, it takes much time for automatic functions such as automatic focusing (called AF), automatic white balancing (called AWB), automatic exposure (called AE), and so forth, to establish their optimum conditions for the image of the latter moving image mode. This causes an initial portion of the image photographed in the moving image mode to be recorded as an unclear image when the mode is changed from the still image mode to the moving image mode.

OBJECT AND SUMMARY OF THE INVENTION

It is therefore an object of the invention to provide a video camera having automatic functions which exhibit immediate response to a change in status of the mechanical shutter.

According to an aspect of the invention, there is provided a video camera capable of photographing in a moving image mode and a still image mode, comprising;

a mechanical shutter provided near the front surface of an image pickup device;

detecting means provided with an image pickup signal according to the status of the mechanical shutter; and a controller provided with an output of the detecting means, the controller including a filter and a filter controller for controlling the time constant of the filter, wherein the time constant of the filter is decreased by the filter controller when a control signal for the video camera is generated.

According to another aspect of the invention, there is provided a video camera capable of photographing in a moving image mode and a still image mode, comprising;

a mechanical shutter provided near the front surface of an image pickup device;

detecting means provided with an image pickup signal according to the status of the mechanical shutter; and a controller provided with an output of the detecting means, wherein an image pickup signal of a still image is held by the controller in the still image mode and wherein a control signal for the video camera is generated based on information derived from the still image at the time when the mode is changed from the still image mode to the moving image mode.

The above, and other, objects, features and advantages of the present invention will become readily apparent from the following detailed description thereof which is to be read in connection with the accompanying drawings.

DETAILED DESCRIPTION OF A PREFERRED EMBODIMENT

Figure 1:
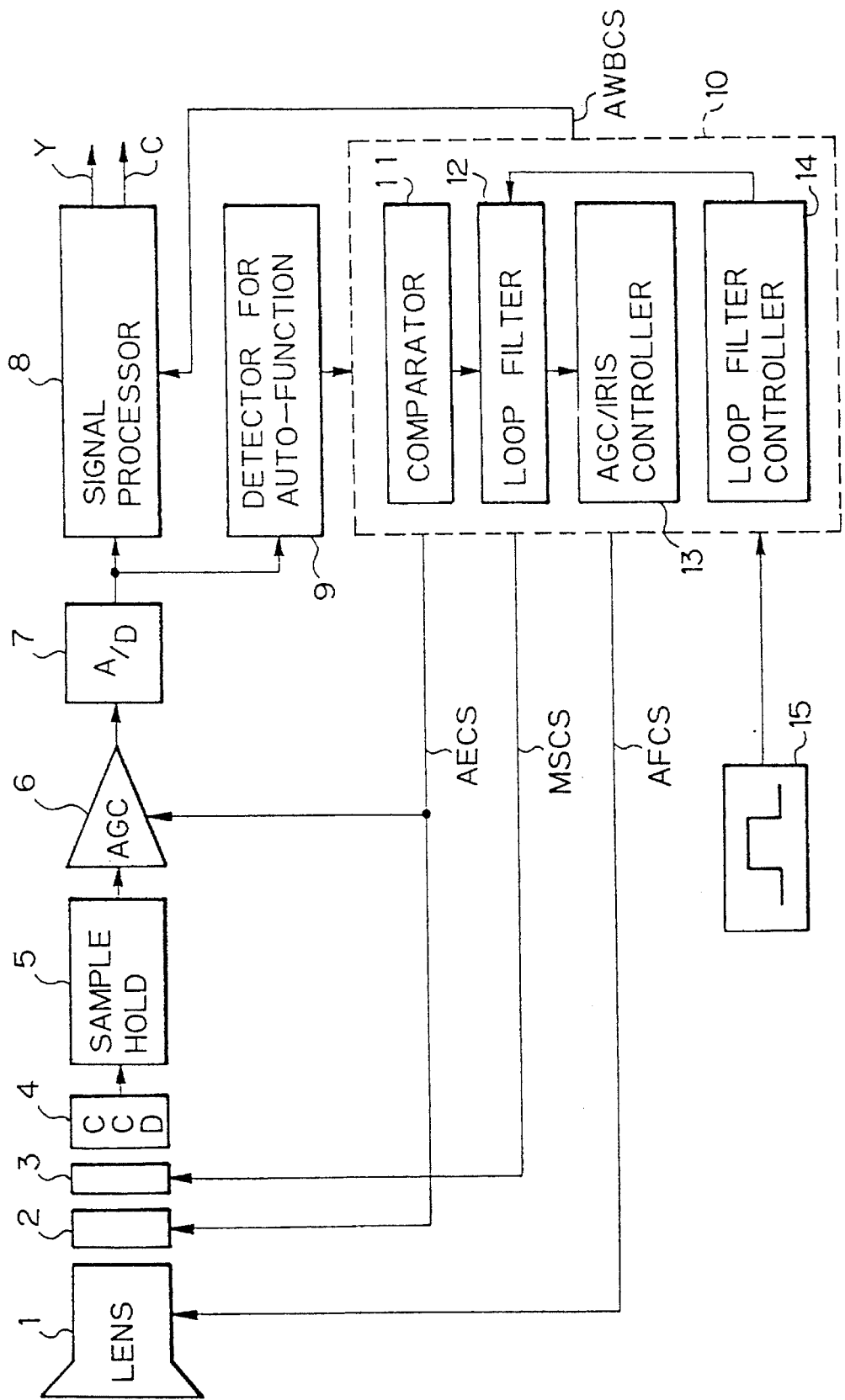
FIG. 1 is a circuit block diagram of a video camera to which the invention is applied.

An embodiment of the invention is explained below with reference to the drawings. FIG. 1 is a circuit block diagram of a video camera to which the invention is applied. In FIG. 1, light injected through a lens 1 and including an image of a subject is sent through an iris 2 and a mechanical shutter 3 to a CCD image pickup device 4, and photoelectrically converted therein. An output signal of the CCD image pickup device 4 is supplied to a sample-holding circuit 5 and further to an AGC (Automatic Gain Control) amplifier 6. A signal amplified to a reference level by the AGC amplifier 6 is converted to a digital signal by an A/D converter 7, and then supplied to a signal processor circuit 8 and to a detector circuit for automatic functions 9.

The digital signal supplied from the A/D converter 7 undergoes predetermined signal processing (gamma correction, chrominance modulation and so on) in the signal processor circuit 8, and then output in the separated forms of a luminance signal Y and a chrominance signal C. On the other hand, the detector circuit 9 executes detection required for AF, AWB, AE, and so on, and a resulting output of the detection is supplied to a controller 10.

The controller 10 includes a comparator 11, a loop filter 12, an AGC/iris gain controller 13, a loop filter controller 14, and other circuits. The detected signal from the detector circuit 9 is supplied to the comparator 11. The comparator 11 has a reference potential, and compares the detected signal with the reference potential. An output signal from the comparator 11 is supplied through the loop filter 12 to the AGC/iris gain controller 13. The time constant of the loop filter 12 is controlled by the loop filter controller 14.

The controller 10 has a shutter button 15 provided outside. By using the shutter button 15, a user can photograph a desired subject as a still image. Whether the shutter button 15 is in use or not is judged by the controller 10. In response to a result of the judgment, a control signal MSCS is supplied to the mechanical shutter 3 to control its open/closed status.

The controller 10 supplies a control signal AFCS to the lens 1 to control AF and a control signal AECS to the iris 2 and to the AGC circuit 6 to control AE. Further, the controller 10 supplies a control signal AWBCS to the signal processor circuit 8 to adjust AWB.

When an image is taken in the moving image mode with the video camera to which the invention is applied, an image of a subject injected through the lens 1 is supplied as a digital signal to the detector circuit 9. The controller 10 generates control signals based on a detected signal from the detector circuit 9, and supplies them to predetermined respective circuits. These control signals are used for automatic controls of AF, AE, AWB, and so forth.

On the other hand, when the shutter button 15 is used during photographing in the moving image mode to change it to photographing in the still image mode, a signal from the shutter button 15 is supplied to the controller 10. In response to the output signal, control signal MSCS is applied from the controller 10 to the mechanical shutter 3 to change it from the open status to the closed status. In response to the mechanical shutter 3 being changed to the closed status, information on optical controls such as AF, AE, AWB, and so forth at this time is held unchanged.

At the moment when the mode is changed again from the still image mode to the moving image mode, the control signal from the loop filter controller 14 is applied to the loop filter 12. As a result, the time constant of the loop filter 12 is decreased to increase the response speed of the automatic function to match the moving image mode. That is, by decreasing the time constant of the loop filter 12, the time required for generating respective control signals is decreased. The generated control signals AFCS, AECS and AWBCS are supplied to the respective predetermined circuits to change AF, AE and AWB to their respective optimum conditions.

Figure 2:
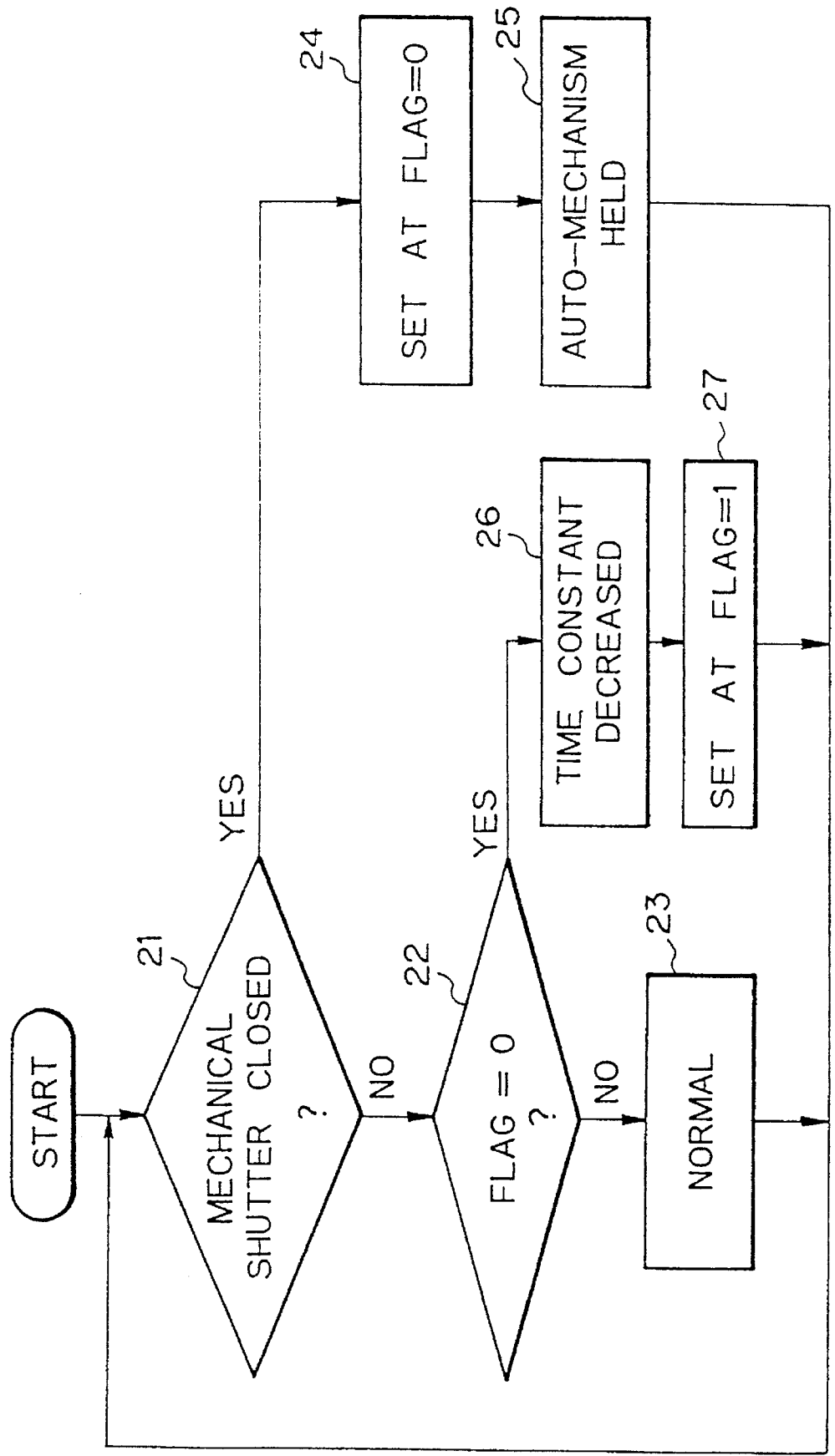
FIG. 2 is a flow chart showing the relationship between the status of a mechanical shutter and an auto-functional operation status.

FIG. 2 is a flow chart showing the relationship between the open/closed status of the mechanical shutter 3 and the operation status of the automatic functions. In FIG. 2, whether or not the mechanical shutter 3 has been changed to the closed status is determined in step 21. If the camera is in use in the moving image mode, the shutter button 15 is not being used. Therefore, the mechanical shutter 3 is held in the open status, and the control signal MSCS is not supplied from the controller 10 to the mechanical shutter 3. In step 22, the status of the flag is determined. Since the flag is set at "1" in the moving image mode, the control returns to step 21 via step 23. As a result, photographing in the moving image mode is continued.

In order to change the photographing mode from the moving image mode to the still image mode, the shutter button 15 is used. Then the control signal MSCS is supplied to the mechanical shutter 3 to close it. In step 21, the closed state of the mechanical shutter 3 is detected. Therefore, the control moves to step 24. In step 24 the flag is set at "0" for the still image mode, and in step 25 information on AF, AE, AWB, and so forth at this time is held.

When photographing is done after again changing the mode from the still image mode to the moving image mode, it is determined in step 22 that the flag exhibits "0". Therefore, the processing moves to step 26. In step 26, the control is performed so that the time constant of the loop filter 12 is decreased. That is, the control signal from the loop filter controller 14 is applied to the loop filter 12. Thus, the time required for generating respective control signals is decreased. As a result, automatic functions of AF, AE, AWB, and so on can be immediately carried out. After this, the flag which has been set at "0" is set again to "1" in step 27.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

According to the invention, when the mode is changed from the still image mode to the moving image mode, the response speed of optical control can be increased, and it is therefore possible to always establish an optimum photographing condition irrespective of photographing modes.

What is claimed is:

1. A video camera capable of photographing in a moving image mode and a still image mode, said camera comprising:

a CCD image pickup device generating an image pickup signal;

a mechanical shutter provided adjacent to a front surface of said image pickup device;

an automatic function detector circuit receiving said image pickup signal for producing a detection output therefrom;

a controller for producing an automatic exposure control signal, an automatic white balance control signal, and an automatic focus control signal in response to said detection output from said automatic function detector circuit, said controller including a loop filter having a time constant and a loop filter controller for controlling said time constant of said loop filter; and a mode selector connected to said controller for selecting said still image mode or said moving image mode, wherein said time constant of said loop filter is decreased by said loop filter controller to increase the response speed when said moving image mode of said video camera is selected by said mode selector, said loop filter time constant being smaller and the response speed faster in said moving image mode than in said still image mode.

2. A video camera capable of photographing in a moving image mode and a still image mode, said camera comprising:

a CCD image pickup device generating an image pickup signal;

a mechanical shutter provided adjacent to a front surface of said image pickup device;

an automatic function detector circuit receiving said image pickup signal for producing a detection output therefrom;

a controller for producing an automatic exposure control signal, an automatic white balance control signal, and an automatic focus control signal in response to said detection output from said automatic function detector circuit, said controller including a loop filter having a time constant; and a mode selector connected to said controller for selecting said still image mode or said moving image mode, wherein information derived from said image pickup signal of a still image is held by said controller in said still image mode, and wherein a control signal of said video camera reduces the time constant of said loop filter and increases the response speed of said video camera based on information derived from said image pickup signal held by said controller when said moving image mode is selected by said mode selector, said loop filter time constant being smaller and said response speed faster in said moving image mode than in said still image mode.

* * * * *